(12) United States Patent
Sabin

(10) Patent No.: US 11,784,823 B2
(45) Date of Patent: *Oct. 10, 2023

(54) OBJECT SIGNING WITHIN A CLOUD-BASED ARCHITECTURE

(71) Applicant: DigiCert, Inc., Lehi, UT (US)

(72) Inventor: Jason Allen Sabin, Lehi, UT (US)

(73) Assignee: DigiCert, Inc., Lehi, UT (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/200,005

(22) Filed: Mar. 12, 2021

(65) Prior Publication Data

US 2022/0021543 A1 Jan. 20, 2022

Related U.S. Application Data

(63) Continuation of application No. 15/897,074, filed on Feb. 14, 2018, now Pat. No. 10,958,437, which is a continuation of application No. 13/965,184, filed on Aug. 12, 2013, now Pat. No. 9,900,157.

(60) Provisional application No. 61/683,839, filed on Aug. 16, 2012.

(51) Int. Cl.
H04L 9/32 (2006.01)
H04L 9/08 (2006.01)
G06F 9/455 (2018.01)

(52) U.S. Cl.
CPC .......... H04L 9/3247 (2013.01); H04L 9/0894 (2013.01); G06F 9/45558 (2013.01)

(58) Field of Classification Search
CPC .. H04L 9/3247; H04L 9/0894; G06F 9/45558
See application file for complete search history.

(56) References Cited

FOREIGN PATENT DOCUMENTS

KR 20120050036 * 11/2010 ........... G06F 3/0426

* cited by examiner

*Primary Examiner* — Joseph P Hirl
*Assistant Examiner* — Leynna Truvan
(74) *Attorney, Agent, or Firm* — Baratta Law PLLC; Lawrence A. Baratta, Jr.

(57) ABSTRACT

A system and method for digitally signing an object. An object signing agent sends a signing request for an object to a remote signing server, which, in response to receiving the request, generates a virtual machine executing code for signing the object. The object is signed within the virtual machine and returned to the object signing agent.

22 Claims, 4 Drawing Sheets

OBJECT SIGNING WITHIN A CLOUD-BASED ARCHITECTURE

PRIORITY CLAIM

This application is a continuation of U.S. patent application Ser. No. 15/897,074, filed on Feb. 14, 2018, which is a continuation of U.S. patent application Ser. No. 13/965,184, filed on Aug. 12, 2013, which claims the benefit of provisional application Ser. No. 61/683,839, filed on Aug. 16, 2012, each of which is incorporated herein in its entirety.

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Over the past few years, cloud-based certificate services have become increasingly more common. As customers discover the conveniences provided by storing, managing, and using keys remotely, more and more customers have moved their key and certificate operations to secure online facilities. Key operations performed online include encryption, decryption, and object signing.

However, moving signing operations creates significant security risks as attackers can compromise the signing system and freely create trusted code. To move to a cloud-based signing solution, customers need a highly secure and auditable environment. After all, there are new reports every day of a system being compromised. A static signing system lacks the security of a dynamic signing system as an attacker can insert malware during the signing process once the signing environment is compromised. A highly secure and audit system prevents signing abuse while the triggering alerts if the system is ever compromised. The dynamic environment means that even if a single signing instance is compromised, future signings can proceed in a secure fashion without the being subject to the same compromise.

SUMMARY OF THE INVENTION

This invention uses a cloud-based architecture to sign objects by dynamically creating a cloud-based virtual machine with the ability to sign objects, perform network and object isolation, and encrypt and store keys generated by an object signing agent.

The invention uses an object signing agent to access a cloud-based signing system through an encrypted tunnel. The object is sent to the cloud system after the access is authenticated. A compliance engine evaluates the object's properties and contents to make sure the object is appropriate for signing.

A certificate manager is used to create and protect key pairs that are used in the signing and to create encrypted isolated spaces, typically virtual machines. A multi-tenancy manager ensures that all signing events and the dynamic creation of secure isolated spaces occurs in the appropriate tenancy, ensuring that the system remains free from compromise.

A security manager monitors the entire process to track performance and report anomalies. Events created during the process are stored in a security event database for audit purposes.

DETAILED DESCRIPTION

This invention describes a cloud-based system and method that dynamically creates cloud-based signing environments and uses the dynamic cloud-based environment to sign specified objects. Because the objects are signed in a dynamic environment, the signing system can accommodate multiple users acting in the signing process while still eliminating the possibility of a bad actor inserting malware during the signing process. Using the dynamic signing environment (the virtual space), the users can collaboratively sign objects safely, perform network and object isolation, and encrypt and store keys generated by an object signing agent.

The figures illustrate various embodiments of the invention; however, the invention is not limited to the specific implementation shown in the figures, as several of the steps and components are optional or intended only to increase performance, ease of use, and security of the overall system. A component or process, as used herein, may refer to a software package, virtual appliance, device, system, or other apparatus or process that can perform the described function.

Figure 1:
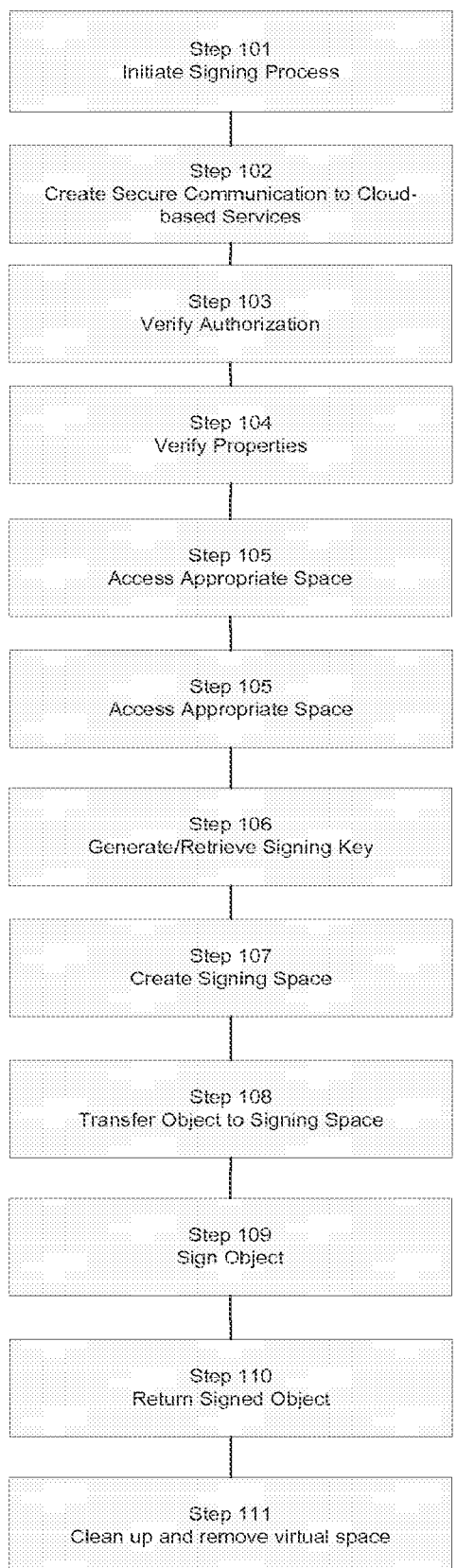
FIG. 1 is a flowchart showing a first embodiment of the system.
Figure 2:
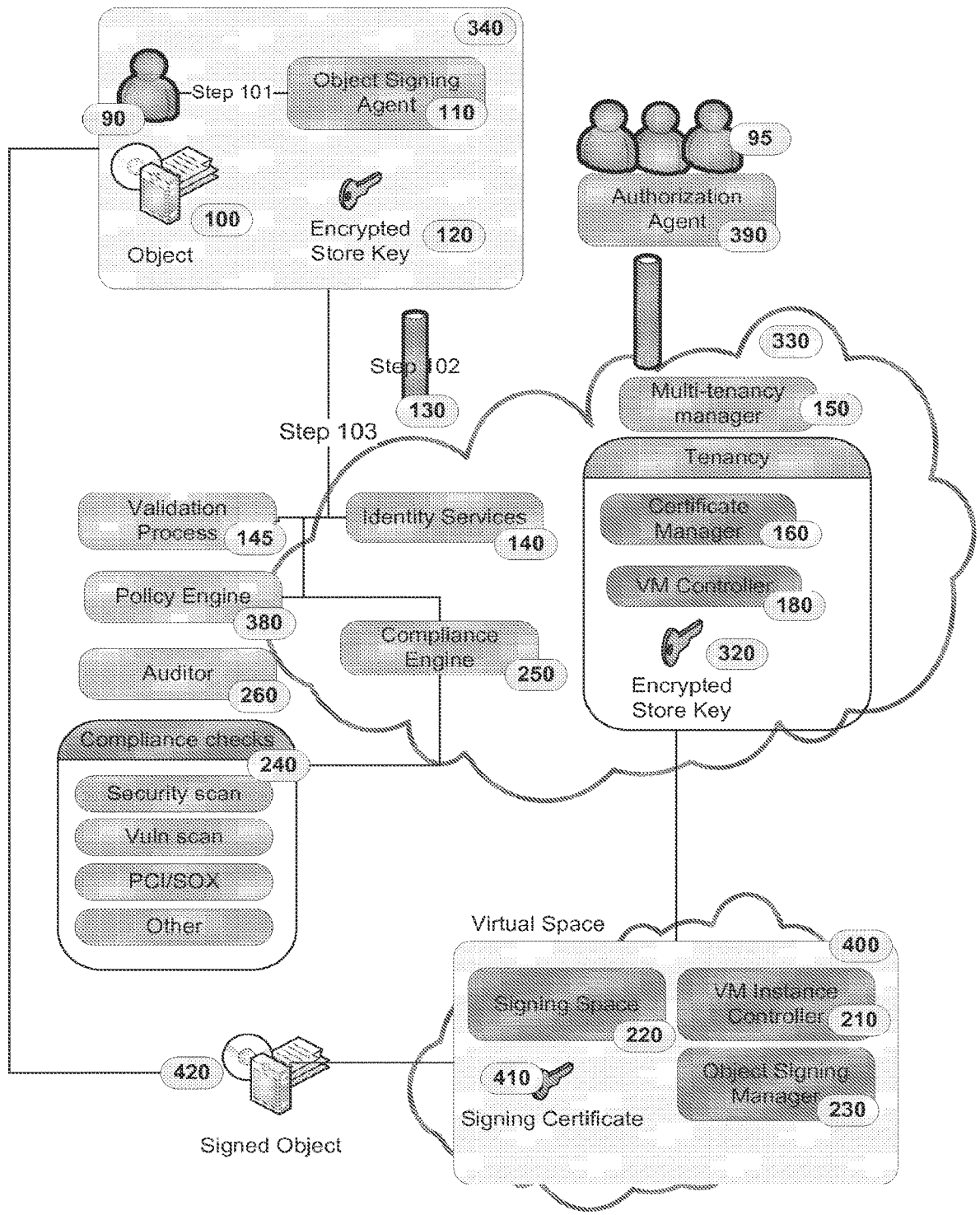
FIG. 2 is a depiction of the components used in the first embodiment.

In the embodiment shown in FIG. 1 and FIG. 2, an object 100 requires a digital signature to protect, generally to protect against alteration and attest to the identity of the object provider. The object may be code, a document, a component, or other electronic data file.

In step 101, the signing process is initiated through an object signing agent 110. An object signing agent 110 is a component used to communicate with a cloud-based signing system 330. The object signing agent initiates the signing process and is responsible for transferring objects and information from the local/remote network 340 to the cloud-based signing system.

The signing process and object signing agent are typically initiated through input from a user 90 or by an automated call to the object signing agent, such as through a scheduler. The object signing agent may be installed locally within an organization's network 340, be an API command into the service provider's online signing system, or be an electronic interface that can be used to supply to the objects.

In step 102, to create a secure transmission and signing process, the object signing agent (or another component) generates or secures access an encrypted store key 120. The encrypted store key is used to establish a dynamic and secure form of communication 130, such as a reverse SSH/SSL tunnel or VPN connection, between the object signing agent and the cloud-based signing system. The encrypted store key may be created dynamically to create temporary secure channels of communication or may be a more permanent key used to repeatedly establish secure communication.

In step 103, the identity services component 140 vets the identity and authenticity of the request for signing, which may include vetting the user's identity and credentials in making the request, authorization of the object signing agent to create a secure communication, verifying that the required number of actors are present for the signing (if multi-party actions are required for signing), verifying the legitimacy and correct issuance of any tokens or credentials presented to access the cloud-based signing system, and the authorization of the object signing agent to access the cloud-based signing services. The identity services is any component or collection of components responsible for performing authentication, authorization, or identification routines. Identity vetting may occur automatically or may trigger an outside validation process 145. The identity services may perform the vetting using any known method, including the use of multi-factor authentication credentials. Identity vetting may include verifying the identity of the organization and the signer.

In step 104, the compliance engine 250 determines whether the object has the necessary properties to apply a signature. A compliance engine is a component or collection of components that verifies the integrity and sign-ability of the object using various compliance checks 240. The compliance engine may be used to ensure that the objects are provided in the correct format, that object is appropriate for signing, and that the object is free of malware. The compliance engine may run at the same time as the identity vetting services, may be part of the identity services, may operate within object signing agent or as part of the cloud-based signing services, and may occur as a separate threaded process to run in parallel with the identity services.

These compliance checks may trigger automated alerts or alerts that halt the signing process until a review by an auditor 260 can be completed. An automated auditor may use the compliance check results to evaluate the risk of an object and the implications of signing the object. Risk information and the results of an auditor can be reported visually to the user through the object signing agent. Risk information may also cause an automated process to execute that tries to remedy detected non-compliances.

Failed compliance checks may cause the tenancy system to lock out the user as it could be a security breach or unauthorized access. Compliance checks may include security scans, vulnerability scans, PCI/SOX, and any other type of compliance scans. These checks can also validate the tenancy and signing environment to make sure everything is secure prior to signing.

This identity services and compliance engine process may occur at any time during the signing process and may occur multiple times during the signing to ensure an attack has not occurred during the process and that a separate party has not compromised the security of the system.

The identity services and compliance engine may both utilize the same or a separate policy engine 380 as part of the vetting and compliance process. Identity services may use the policy engine to determine the authorization of objects, users, and systems. The policy engine may also specify a minimum number of authorizations required for signing to complete and when the external validation services are required. The compliance engine can use a policy engine to dynamically update appropriate compliance checks or select the compliance checks based on authorization and object properties. For example, a code signing event will likely trigger separate compliance checks than a document signing event. The policy engine may be part of the object signing agent, stored on a separate location within the corporate network, or accessed through the cloud-service provider.

A policy engine can also check for any additional workflow process needs or actions that should be performed on the object or requester. For example, if a request is sent from an unknown entity, the identity services validate the request and verify the authorization in accordance with the cloud-based service's policies and procedures. The policy engine determines the extent of this vetting process and where access is authorized.

In step 105, a multi-tenancy manager 150 processes the request for signing and access the tenancy 400 specific to the user and object signing agent. A multi-tenancy manager is a component or collection of components that can control tenancy operations within the cloud-based signing system. Although multi-tenancy is not strictly required for cloud-based signing, for security reasons, the cloud-based system should use multi-tenancy and an isolated process and virtual machine for each entity using the system.

If multi-user authorization is required for signing, based on the signing policy, then each additional user 95 accessing the system will be directed to the same tenancy. Multi-user authentication by having each user access the cloud-based signing system through an object signing agent, which may be a light-weight authorization agent 390 that comprises solely of components necessary to create a secure form of communication, call the identity services component to verify authorization, and submit a signing approval mechanisms.

In step 106, a certificate manager component 160, which is a component used to provide key management/certificate operations within the cloud-based signing system or tenancy, generates an object-signing digital certificate (or just the key pair) 410 or retrieves a previously created object-signing digital certificate. The certificate manager may create digital certificates as needed for signing operations or may utilize a repository of previously created certificates for signing purposes. The contents of a dynamically created digital certificate are based on policies set by the user's organization and by the service-provider, which may be retrieved from the policy engine that is part of the identity services.

In step 107, an encrypted store key 320 associated with the tenancy (or dynamically generated) creates a new secure space 220 within the tenant's file system 400. Typically, the encrypted store key in this operation is part of the tenancy dedicated to the client. That way a compromise of one tenant's encrypted store key will not affect the security of another client. The new space should be encrypted and isolated from other files within the same tenancy or cloud-based signing system, typically by having the signing space be on a new virtual machine created using a VM controller 180.

In step 108, the object is transferred through a secure connection to the isolated space.

In step 109, after the compliance checks complete, the identity services complete, and all necessary authorizations are provided, the signing process executes on the object using the signing private key/certificate 410. The signing creates a signed version of the object 420.

The signing can be controlled by an object signing manager 230 operating in the virtual space. An object signing manager is a component or a combination of components that can functionally sign objects and may be used to isolate objects, generate encrypted file systems to store objects, execute compliance checks, and perform auditing.

In step 110, the signed object is returned to the user through a secure connection. At the same time, the system cleanup process executes, deleting temporary files and removing unneeded virtual space. Any temporary keys are destroyed. The signing key may be stored securely in escrow services if needed for future use.

Figure 3:
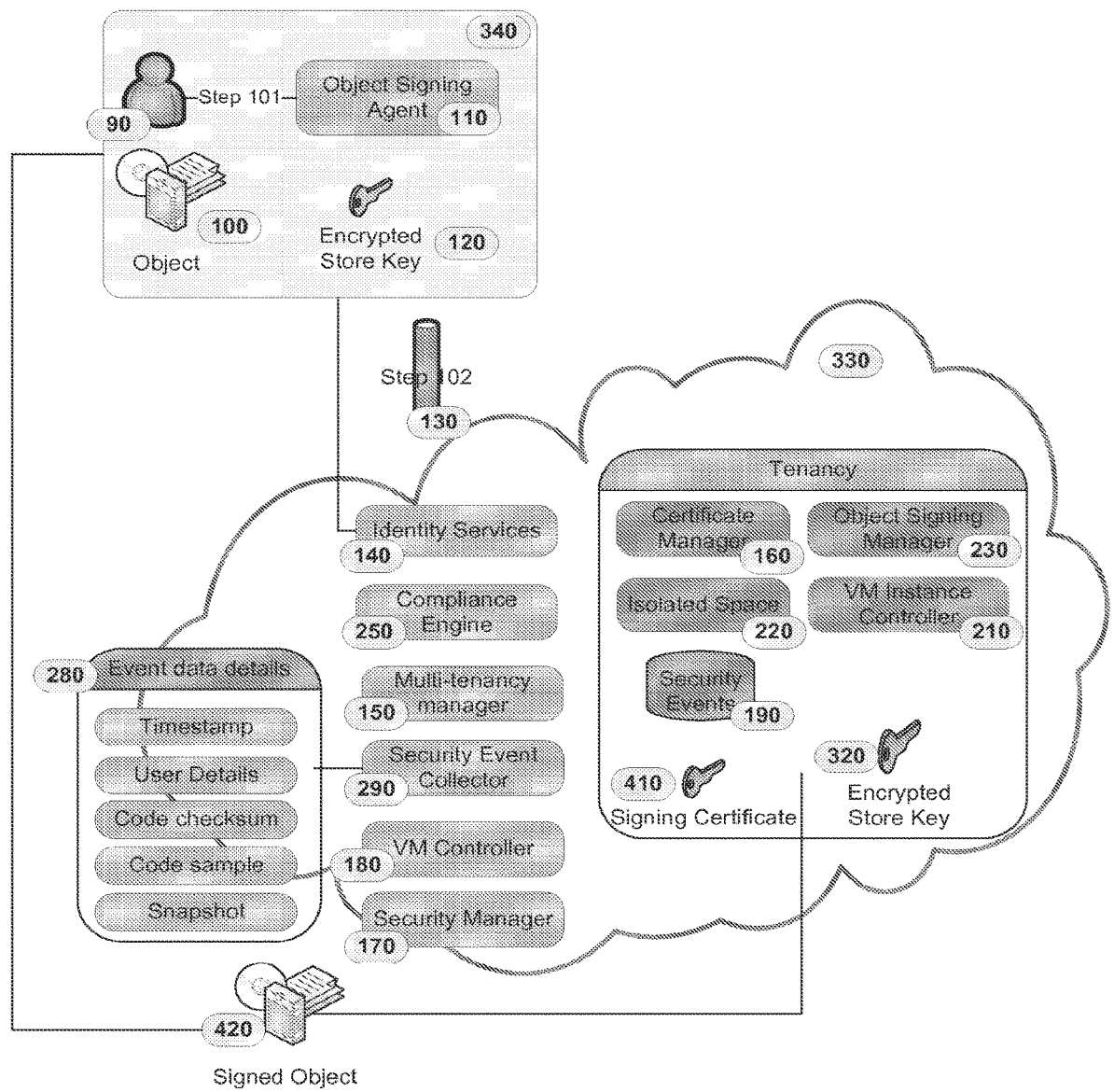
FIG. 3 is a depiction of the components used in a second embodiment.

The embodiment in FIG. 3 shows an alternative implementation of the invention where tenancy is used to create isolated space, generate the private keys used for signing, and provide the object signing manager. The signing still occurs in the isolated space.

In addition, FIG. 3 shows that all related event data details 280 generated during the signing process, including timestamps, identification details, code checksums, code samples, and other important audit items, are collected and stored by a security event collector 290. After the signing is complete, the files are removed from the encrypted store space and returned to the object signing agent. A VM Instance controller 210 can function as part of the security event controller and take a snapshot of the object signing virtual machine or isolated space. This snapshot is stored as a security event, allowing retrieval of the signing environment at any time for audit purposes. Related event details can be returned to the object signing agent for use by the user and stored in a security events database 190 for audit purposes.

Throughout the signing process, a security manager 170 can monitor the signing environment's security. A security manager is a component or collection of components responsible for evaluating the security of the signing process. The security event collector may be part of the security manager. The security manager can use a VM controller 180 to dynamically create virtual machines based on the security needs of the system. Creation of a virtual machine may occur in response to a detected security event or simply as part of the compliance checks and system evaluation.

Dynamically creating virtual machines permits the security manager and compliance engine to perform various checks and evaluations that are tailored to the requirements of each signature, such as creating a dedicated virtual machine that can be used to compile objects that consists of source code in isolation from the rest of the system. A dynamic virtual machine can be used to sandbox the object in order to test for malware. A user can even use the security manager's virtual machine to test object functionality on various operating systems and use installed tools. The virtual machine can be created on the service provider's cloud systems, the company's cloud, or any other infrastructure.

Figure 4:
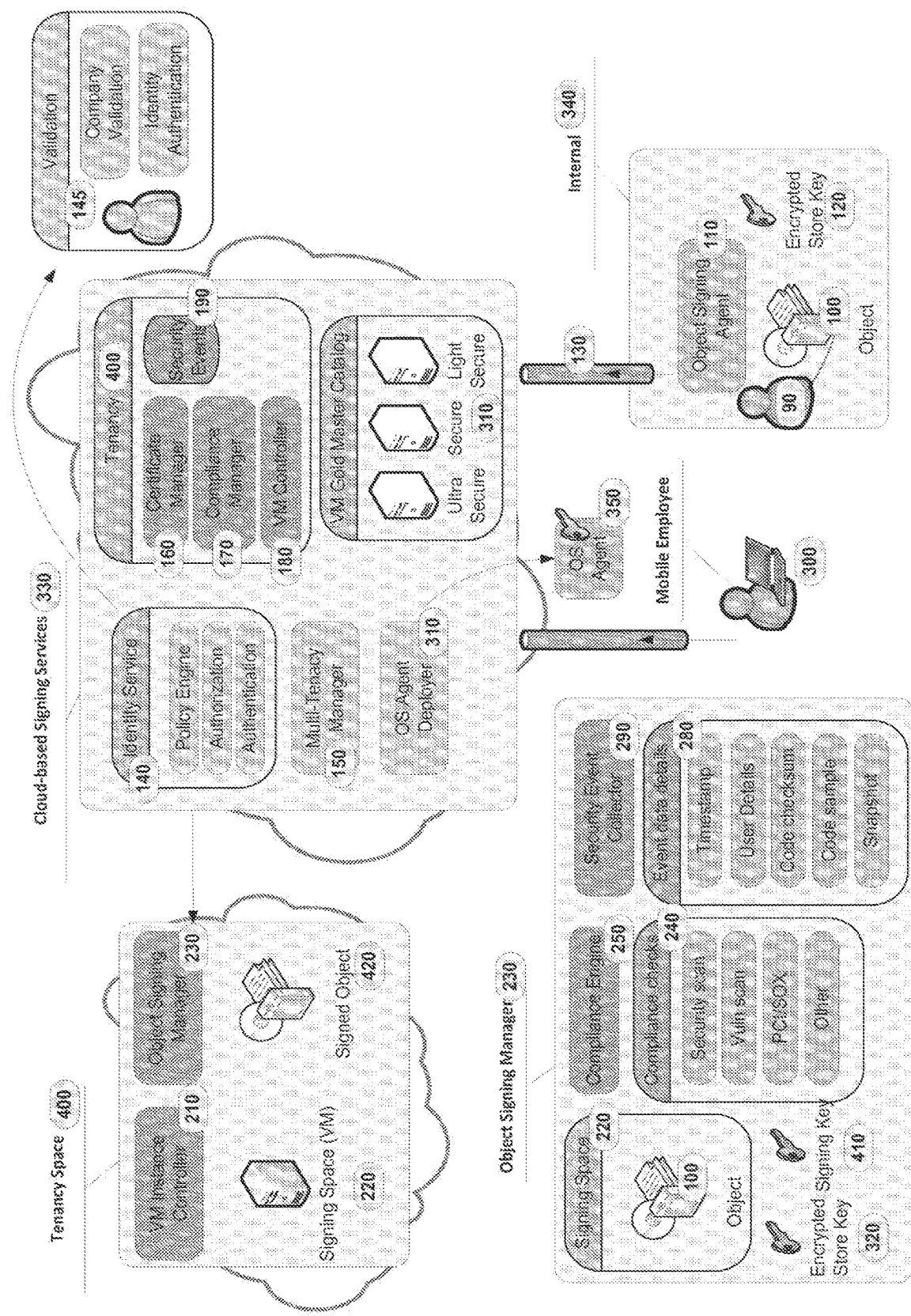
FIG. 4 is a depiction of the components used in a third embodiment.

As shown in the embodiment in FIG. 4, the object signing manager can be a dedicated system that performs most of the signing and evaluation tasks, including creating the signing space 220 within the object signing manager. In this embodiment, after the identity services are performed, the multi-tenancy manager initiates the object signing manager within the tenant's virtual space. The object signing manager creates an isolated and encrypted space using the encrypted store key 320 that is part of the object signing manager instance.

Once signing is authorized, the compliance engine activates and performs the necessary compliance checks 240. The object signing manager then dynamically creates a signing key 410. The object signing manager uses the signing key to create the signed object in the object signing manager's signing space 220. The object manager's signing space is a virtual machine space created dynamically by the object signing manager during the signing process. The signed object is stored in the tenancy file system until the user requests return of the signed object.

The object signing manager also controls the security event collector and constantly monitors important event data details. These event data details are recorded in the tenancy's more permanent security events database 190.

As an additional feature, mobile users 300 may need to remotely access the object signing agent or cloud-based signing services in order to initiate signing services, address security issues or problems detected during the signing process, or participate in/authorize the signing. If access is permitted by the relevant policy engine, the mobile users are authenticated via the identity services and establish access to the cloud-based signing system. Mobile users access the system via a mobile signing agent 310 that is a temporary or light-weight version of the object signing agent. The mobile signing agent is provided to the mobile device by the mobile signing agent deployer 350, which controls access to instances of the mobile signing agents and facilitates communication between the object signing agent multi-tenancy manager to ensure the correct tenancy is accessed and used. This download may include an encrypted store key or by communicating with a remote object signing agent through a secure tunnel.

After accessing the system, the signing process for a mobile user executes in the same fashion as a local user. Supporting mobile signing permits dynamic object signing for sole proprietors that do not have the resources to establish their own cloud location for signing and need a temporary solution for infrequent signings.

With mobile signings, the mobile signing agent only exists when signing is required. All keys, certificates, and other sensitive information are stored securely in the cloud and provided dynamically to the mobile user when required by the signing process. This permits the entire signing to occur in a secure cloud-based environment, eliminating the need for a high-level of technical expertise. The user simply accesses the mobile signing agent and lets the cloud-based signing system systems execute the remaining functions in the tenant's secure and segmented space.

What is claimed is:

1. A computer-implemented method for cloud-based object signing, the method comprising:
   receiving, at a computing device, an object and a request to sign the object; in response to the request to sign the object, dynamically creating, with the computing device, a virtual machine having a signing space based on a determined security of the cloud-based object signing;
   obtaining, with the virtual machine, a signing key;
   digitally signing, using the virtual machine, the object in the signing space with the signing key; and
   after digitally signing the object:
      destroying the signing key,
      cleaning up and removing the virtual machine, and
      transmitting the digitally signed object.

2. The method of claim 1, wherein the object comprises code.

3. The method of claim 1, wherein the object comprises a document.

4. The method of claim 1, wherein the object comprises an electronic data file.

5. The method of claim 1, further comprising taking a snapshot of the virtual machine prior to removing the virtual machine.

6. The method of claim 5, further comprising:
obtaining the snapshot of the virtual machine; and
with the snapshot, restoring the virtual machine.

7. The method of claim 6, further comprising performing an audit of the restored virtual machine.

8. The method of claim 1, further comprising collecting and storing event data generated while digitally signing the object.

9. The method of claim 1, further comprising collecting and storing event data generated between creation and removal of the virtual machine.

10. The method of claim 9, wherein the event data comprises at least one of timestamps, identification details, object checksums, or object samples.

11. The method of claim 10, further comprising performing an audit of the virtual machine or the digitally signed object using the event data.

12. The method of claim 1, further comprising validating the request to sign the object before dynamically creating the virtual machine.

13. The method of claim 1, further comprising:
validating the request to sign the object by vetting at least one of an identity and credentials of a user associated with the request to sign the object.

14. The method of claim 1, further comprising:
validating the request to sign the object by verifying that a required number of actors are present for the signing.

15. The method of claim 1, further comprising:
validating the request to sign the object by verifying legitimacy of any credentials received in connection with the request to sign the object.

16. The method of claim 1, further comprising determining whether the object complies with a set of predetermined properties.

17. The method of claim 1, further comprising determining whether the object is properly formatted and free of malware.

18. The method of claim 1, wherein the signing space is encrypted.

19. The method of claim 1, further comprising:
performing one or more compliance checks on the object to verify integrity and sign-ability of the object, wherein the one or more compliance checks comprise one or more of: running one or more security scans against the object;
running one or more vulnerability scans against the object;
running one or more Payment Card Industry/Sarbanes-Oxley (PCI/SOX) scans against the object;
verifying that the object is in a correct format; and
verifying that the object is free of malware.

20. At least one non-transitory computer readable medium for cloud-based object signing, the at least one non-transitory computer readable medium storing computer executable instructions that, when loaded into computer memory and executed by at least one processor, cause the at least one processor to:
receive an object and a request to sign the object;
in response to the request to sign the object, dynamically create a virtual machine having a signing space based on a determined security of the cloud-based object signing;
obtain, with the virtual machine, a signing key;
digitally sign, using the virtual machine, the object in the signing space with the signing key; and
after digitally signing the object:
destroy the signing key,
clean up and remove the virtual machine, and
transmit the digitally signed object.

21. The at least one non-transitory computer readable medium of claim 20, wherein the computer executable instructions, when loaded into the computer memory and executed by the at least one processor, further cause the at least one processor to:
perform one or more compliance checks on the object to verify integrity and sign-ability of the object, wherein the one or more compliance checks comprise one or more of:
run one or more security scans against the object; run one or more vulnerability scans against the object;
run one or more Payment Card Industry/Sarbanes-Oxley (PCI/SOX) scans against the object;
verify that the object is in a correct format; and
verify that the object is free of malware.

22. The at least one non-transitory computer readable medium of claim 20, wherein the computer executable instructions, when loaded into the computer memory and executed by the at least one processor, further cause the at least one processor to:
take a snapshot of the virtual machine prior to removing the virtual machine;
obtain the snapshot of the virtual machine; and
with the snapshot, restore the virtual machine.

* * * * *